JACOB RADSTON.

Improvement in Stop-Cocks.

No. 120,668.  Patented Nov. 7, 1871.

120,668

UNITED STATES PATENT OFFICE.

JACOB RADSTON, OF SAN FRANCISCO, CALIFORNIA.

IMPROVEMENT IN STOP-COCKS.

Specification forming part of Letters Patent No. 120,668, dated November 7, 1871.

*To all whom it may concern:*

Figure 1:
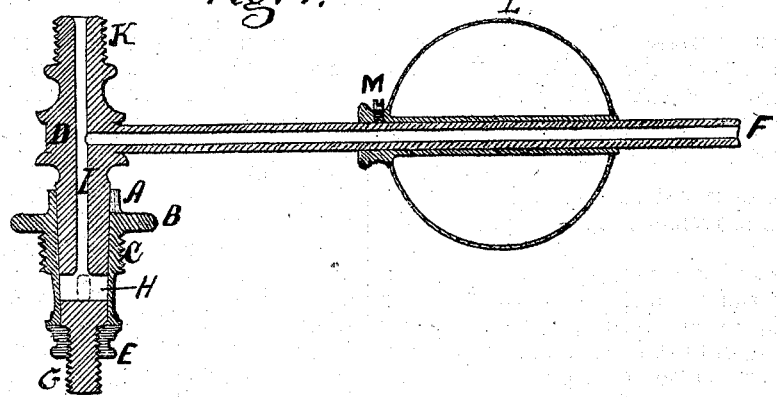
Figure 2:
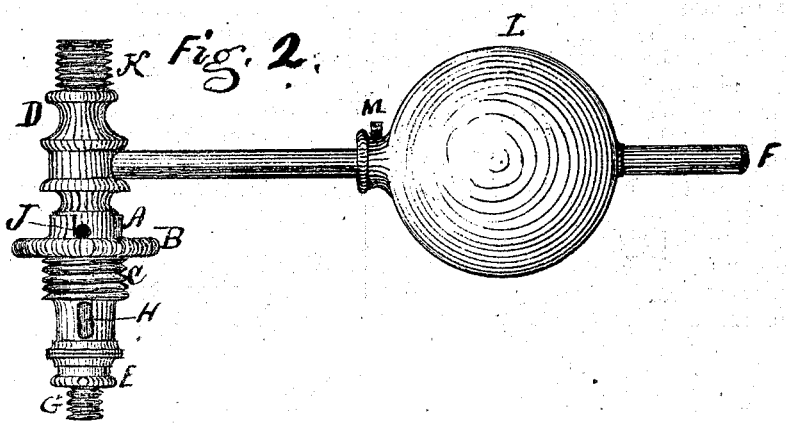

Be it known that I, JACOB RADSTON, of the city and county of San Francisco and State of California, have invented certain Improvements in Stop-Cocks, of which the following is a specification:

Figure 1 is a sectional view, and Fig. 2 an elevation of my improvements as applied to a ball-cock.

This stop-cock is composed mainly of two pieces, the interior or plug D and the exterior or sleeve A, the former part being of tapering form and fitting into the other part, the inner surface of which is also tapering. On the one end of the plug D are screw-threads G for attaching a nut, E, and on the other end like screw-threads K for the fitting of that end of the cock into the swivel end of a pipe, or for the attachment of a nozzle. While the nut E serves to connect the two pieces together, it can also be used as a binding-nut to prevent leakage by keeping the surfaces of the plug and sleeve in close contact. The part A has a milled flange, B, through or by which this part may be screwed into the head of a cask or into such surface as it is wished to attach it by screwing that part having the screw-threads C into the cask, pipe, or surface. A pin, J, on the part D, fits into a recess on the end of A, whereby the rotation of the part D will be limited. In the two parts A and D are corresponding holes or slots H, communicating when in line with the interior or tubular portion I of the plug; and the rotation of the plug within the sleeve establishes or shuts off the flow of the gas or liquid, as the case may be. To the part D is attached a tube, F, having a ball, L, which can be adjusted by the screw M. When this cock is used for drawing off liquids from casks the part A will be screwed into the head of the cask or reservoir, and a nozzle will be screwed into the screw-threads K of part D, the track of the liquid being through the slots and tubular portion I, and out through the nozzle. So, also, will this be the track of the gas when the cock is used to connect gas-pipe. The nozzle not being used the flow of gas will be into the connection-pipe. In both of these conditions the end F of the tube will be closed by a plug. When the cock is used to connect two chambers containing a liquid the conditions will be the same as when used to connect gas-pipe, except when it is intended to have the ball L as a float govern the flow of the liquid, and except, also, when it is intended to have the liquid pass through the tube F. In such case the end of the part D will be covered by a cap screwed onto the threads K.

This construction of the cock, of the two parts A and D, and the manner of affixing the cock to the head of the cask or other surface, places the joining surfaces of the two within the liquid of the cask or reservoir, and shields them from the effect of the changes of temperature of the atmospheric air. In some cases the surfaces of the two parts A and D in contact, instead of being tapering in the same direction, may be made to taper in opposite directions, so that the greater the pressure the tighter will be the joint.

What I claim is—

A stop-cock constructed of the two pieces or parts A and D, having the screw-threads C G K, slots H, and pin J, with the tube F and ball L, as and for the purposes herein recited.

JACOB RADSTON.

Witnesses:
 ALFRED RIX,
 JNO. B. CARSON.

(167)